(12) United States Patent
Tillotson

(10) Patent No.: US 8,666,570 B1
(45) Date of Patent: Mar. 4, 2014

(54) VOLCANIC ASH DETECTION BY OPTICAL BACKSCATTER USING STANDARD AIRCRAFT LIGHTS

(75) Inventor: Brian J. Tillotson, Kent, WA (US)

(73) Assignee: The Boeing Company, Chicago, IL (US)

(*) Notice: Subject to any disclaimer, the term of this patent is extended or adjusted under 35 U.S.C. 154(b) by 694 days.

(21) Appl. No.: 12/949,873

(22) Filed: Nov. 19, 2010

(51) Int. Cl.
G06T 7/00 (2006.01)

(52) U.S. Cl.
USPC ............... 701/14; 701/28; 340/945; 340/968

(58) Field of Classification Search
USPC ................ 701/14, 28; 340/945, 968; 356/28
See application file for complete search history.

(56) References Cited

U.S. PATENT DOCUMENTS

| | | | | |
|---|---|---|---|---|
| 4,725,733 A * | 2/1988 | Horman et al. | ........... | 250/339.14 |
| 5,241,315 A | 8/1993 | Spinhirne | | |
| 5,602,543 A * | 2/1997 | Prata et al. | ........... | 340/968 |
| 5,654,700 A * | 8/1997 | Prata et al. | ........... | 340/963 |
| 5,767,519 A | 6/1998 | Gelbwachs | | |
| 6,404,494 B1 | 6/2002 | Masonis et al. | | |
| 6,490,530 B1 | 12/2002 | Wyatt | | |
| 6,556,282 B2 * | 4/2003 | Jamieson et al. | ........... | 356/4.01 |
| 6,828,923 B2 * | 12/2004 | Anderson | ........... | 340/968 |
| 7,298,869 B1 * | 11/2007 | Abernathy | ........... | 382/108 |
| 7,557,734 B2 * | 7/2009 | Estrada et al. | ........... | 340/963 |
| 7,566,881 B2 * | 7/2009 | Parvin et al. | ........... | 250/394 |
| 7,656,526 B1 | 2/2010 | Spuler et al. | | |
| 7,755,515 B2 * | 7/2010 | Hagan | ........... | 340/961 |
| 7,913,457 B1 * | 3/2011 | Orr | ........... | 52/2.23 |
| 7,933,002 B2 * | 4/2011 | Halldorsson | ........... | 356/28 |
| 8,339,583 B2 * | 12/2012 | Tillotson | ........... | 356/28 |
| 8,461,531 B2 * | 6/2013 | Tillotson | ........... | 250/338.5 |
| 8,471,730 B2 * | 6/2013 | Tillotson | ........... | 340/945 |
| 2009/0143988 A1 * | 6/2009 | Tillotson | ........... | 702/3 |
| 2009/0310118 A1 * | 12/2009 | Halldorsson | ........... | 356/28 |
| 2010/0332474 A1 * | 12/2010 | Birdwell et al. | ........... | 707/737 |
| 2010/0332475 A1 * | 12/2010 | Birdwell et al. | ........... | 707/737 |
| 2011/0013016 A1 * | 1/2011 | Tillotson | ........... | 348/135 |
| 2011/0181864 A1 * | 7/2011 | Schmitt et al. | ........... | 356/28 |
| 2011/0188029 A1 * | 8/2011 | Schmitt et al. | ........... | 356/28 |
| 2012/0191350 A1 * | 7/2012 | Prata et al. | ........... | 702/3 |

OTHER PUBLICATIONS

Spinetti et al. "Mt. Etna Volcanic Aerosol and Ash Retrievals Using MERIS and AATSR Data", Proc. 2nd MERIS/(A) ASTR User Workshop, Frascati, Italy, Sep. 22-26, 2008 (ESA SP-666, Nov. 2008).

(Continued)

Primary Examiner — John R Olszewski
Assistant Examiner — Truc M Do
(74) Attorney, Agent, or Firm — Ostrager Chong Flaherty & Broitman P.C.

(57) ABSTRACT

Onboard systems and methods for detection of airborne volcanic ash. One or more cameras are added to an aircraft. Each camera is configured to view a volume of air illuminated by a standard aircraft light, such as a strobe warning light (e.g., located on a wing tip) or a forward-facing landing light (e.g., located in the nose). Each camera is connected to a data processor. When diffuse volcanic ash is present, it scatters light transmitted from the standard aircraft light. Each camera converts impinging backscattered light into digital data which is sent to the processor. The processor processes the data from the camera or cameras to derive a measurement of the backscattered light and issues an alert when the amount and type of backscatter are compatible with the presence of volcanic ash.

22 Claims, 4 Drawing Sheets

(56) References Cited

OTHER PUBLICATIONS

Schumann et al., "Report of Falcon Flight 19DLR;s Research Aircraft 'Falcon 20E' Completes Apr. 2010", Deutsches Zentrum fur Luft-und Raumfahrt.

DLR's Research Aircraft "Falcon 20E" Completes Measurement Flight Successfully, Apr. 19, 2010, Deutsches Zentrum fur Luft-und Raumfahrt.

Chazette, "Sensing and Monitoring Volcanic Ash for Air Travel Safety Using LabVIEW and PXI", Product Design & Development, Jul. 20, 2010.

Carr, The Aerosol Models in MODTRAN: Incorporating Selected Measurements from Northern Australia, DSTO Defence Science and Technology Organisation, Edinburgh, South Australia, Dec. 2005.

Kneizys et al., The MODTRAN 2/3 Report and LOWTRAN 7 Model, Philips Laboratory, Geophysics Directorate, Hanscom AFB, Massachusetts, Jan. 11, 1996.

* cited by examiner

VOLCANIC ASH DETECTION BY OPTICAL BACKSCATTER USING STANDARD AIRCRAFT LIGHTS

BACKGROUND

This invention generally relates to systems and methods for sensing when an aircraft has entered a volcanic plume. As used herein, the term "volcanic plume" means a cloud of volcanic ash. In particular, this invention relates to systems and methods for onboard optical detection of volcanic ash suspended in the atmosphere through which an aircraft is flying.

Volcanic ash can pose a hazard to flying jet aircraft, threaten the health of people and livestock, damage electronics and machinery, and interrupt power generation and telecommunications. Volcanic ash comprises tiny jagged particles of rock and natural glass blasted into the air by a volcano. Wind can carry ash thousands of miles, affecting far greater areas than other volcano hazards.

Volcanic plumes present two problems for aircraft: (a) engine shutdown due to ash; and (b) aircraft damage and/or crew and passenger injury due to ash and corrosive gases. Volcanic ash particles are extremely abrasive. They are jagged particles of rock and glass that can cause rapid wear to the internal workings of jet engines. More important, high temperatures in some parts of jet engines can melt the ash; it then re-solidifies on cooler parts of the engine, forming a layer that blocks airflow, interferes with moving parts, and eventually shuts down the engine.

Another issue is the potentially harmful effects of elevated concentrations of $SO_2$ and sulfate aerosol in ash-poor clouds on aircraft and avionics. In addition, volcanic ash particles, with sulfuric acid adhered thereto, are tiny enough to travel deep into the lungs of human beings, which may be harmful and potentially fatal to people.

The overall technical problem is to provide means for detecting airborne volcanic ash at cruise altitude and then alerting aircraft so they can avoid damage or injury from passage through the volcanic plume. The specific technical problem is to detect volcanic ash in the immediate vicinity of an aircraft at concentrations high enough to damage the airplane or personnel, but too low to be seen by the naked eye.

Three general approaches to solving the specific technical problem of detecting the presence of volcanic ash particles in the atmosphere surrounding an aircraft are the following: (1) naked eye observation; (2) forecasts of locations where volcanic ash may be encountered at various times, based on satellite measurements, pilot reports and a variety of other measurements, all integrated into weather models; and (3) active optical sensors attached to the aircraft and configured to make optical measurements of scattering or attenuation of light from an onboard source (e.g., laser pulses) by the atmosphere outside the aircraft. Each of these approaches has shortcomings.

(1) Naked eye observation is almost entirely dependent on the flight crew, not the cabin crew or passengers. The flight crew typically looks forward from the cockpit, not sideways and backward to the air near the wingtip strobes. Therefore, naked eye observation relies on ambient light. Also naked eye observation has the sensitivity of a human eye which is limited, especially for senior crew members. Also, human vision is insensitive to slow changes in intensity, as when an aircraft enters a plume whose edge is marked by slowly increasing ash density. Lastly, human crew members typically have many duties so they cannot monitor scattering full-time.

(2) Volcanic plume forecasts provide coarse spatial resolution over large regions and are based on non-real-time data.

(3) Prior art with active optical scattering requires installation of a special-purpose optical emitter. For example, the German Aerospace Center completed a successful measurement flight of the volcanic plume over Germany on Apr. 19, 2010. The scientific instruments onboard the research aircraft were installed in the cabin and underneath the wings. A LIDAR (Light Detection and Ranging) instrument was installed in the cabin. Measurements were made via air inlets and optical windows in the roof and the floor of the research aircraft. The LIDAR instrument transmitted laser impulses and received the backscatter signal from the atmosphere.

The problem of detecting the presence of volcanic ash particles in the atmosphere surrounding an aircraft is especially acute at night. In daylight, a diffuse plume of ash spread over several miles may scatter enough light to be visible during an edge-on approach to the plume: the integrated intensity of light scattered by miles of ash is enough to be seen by the naked eye. At night, however, the only illumination of a volcanic plume may come from lights on the airplane. For example, to reduce the risk of in-flight collisions between aircraft, aircraft are required to be equipped with strobe warning lights (e.g., on the wing tips and tail), which pulse a high-intensity, short-duration white light approximately once per second. Alternatively, most modem aircraft are equipped with landing lights which are used to illuminate the terrain and runway ahead during takeoff and landing. Although landing lights are usually extinguished in cruise flight, the landing lights could be turned on in cruise flight (except on those aircraft whose landing lights can only be turned on when the landing gear are extended).

The intensity of illumination from an external light source falls rapidly with distance from the airplane. Therefore, there may not be enough integrated backscatter for human crews to visually detect the volcanic plume until it is so dense that the airplane is damaged.

There exists a need for an easily installed system that will detect the presence of volcanic ash in the surrounding atmosphere using existing light sources on an aircraft, such as a strobe warning light or a forward-facing landing light.

BRIEF SUMMARY

The invention is capable of providing an alert to a flight crew when the amount and type of optical scattering outside the plane is compatible with the presence of volcanic ash, especially while flying at night. In response to the alert, the flight crew can take action to avoid long, unwarned flight through a volcanic plume.

One aspect of the invention is an automated system that uses light emitted by a standard aircraft light, not ambient light or a special-purpose light, to detect when the amount and type of backscatter are compatible with the presence of hazardous amounts of volcanic ash. Various embodiments integrate over several images and/or use image intensifiers, so the system is more sensitive to scattered light than is the human eye. By using an automated system, the backscattering of light radiation emitted by a standard aircraft light, such as a strobe or landing light, can be monitored 100% of the time. This automated system provides fine-grained, local, real-time information.

Another aspect of the invention is a method for automatically detecting the presence of airborne particles outside an aircraft during flight, comprising the following steps: (a) placing a camera inside the aircraft with its field of view directed toward a volume outside the aircraft that receives light radiation from an aircraft light; (b) activating the aircraft light; (c) using the camera to convert impinging light radiation into electronic image data of respective images captured when the aircraft light is activated and when the aircraft light is not activated; (d) determining whether the electronic image data is compatible with the presence of hazardous amounts of volcanic ash in the volume; (e) issuing an activation signal in response to a determination that the electronic image data is compatible with the presence of hazardous amounts of volcanic ash in the volume; and (f) generating a perceptible alarm in response to issuance of the activation signal.

In accordance with various embodiments of the invention, one or more cameras are added to an aircraft. Each camera is configured to view a volume of air illuminated by a standard aircraft light, such as a strobe warning light (e.g., located on a wing tip) or a forward-facing landing light (e.g., located in the nose). Each camera is connected to a data processor. When diffuse volcanic ash is present, it scatters light transmitted from the standard aircraft light. Each camera converts impinging backscattered light into digital data which is sent to the processor. The processor processes the data from the camera or cameras to derive a measurement of the backscattered light and issues an alert when the amount and type of backscatter are compatible with the presence of volcanic ash.

In some embodiments, the cameras are mounted in an informal, self-powered, temporary installation (much like a laptop on a seat-back tray) and can be carried on or off the airplane by a crew member. This avoids or minimizes the FAA certification cost and delay that would be incurred by some other ash detection approaches that require permanent installations on the outside of the aircraft.

A further aspect of the invention is a method for automatically detecting the presence of airborne particles outside an aircraft during flight, comprising the following steps: (a) emitting light radiation toward a volume outside and moving with the aircraft; (b) converting light radiation backscattered from the volume into electronic image data of respective captured images; (c) processing the electronic image data to derive the amount of backscattered light radiation and the rate of change of the amount; (d) determining whether the amount and the rate of change are compatible with the presence of volcanic ash in the volume; (e) issuing an activation signal in response to a determination that the amount and the rate of change are compatible with the presence of volcanic ash in the volume; and (f) generating a perceptible alarm in response to issuance of the activation signal.

It is difficult to optically distinguish volcanic ash from other solid particles, e.g., smoke or ice. Natural water-droplet clouds, on the other hand, typically have much higher scattering than the diffuse, days-old volcanic plumes that are difficult for pilots to detect. Furthermore, the boundaries of water-droplet clouds are typically much sharper than the boundary of a diffuse days-old volcanic plume, so the transition from low scatter to high scatter is relatively quick for clouds but relatively slow for volcanic plumes. In a preferred embodiment, the system is configured to measure both the amount of scatter and the rate at which it changes. The system processor is programmed to distinguish the boundary of a water-droplet cloud (high scatter, high rate of change) from the boundary of a volcanic plume (moderate scatter, slow rate of change) during flight at a cruise altitude.

In other embodiments, effective discrimination can be achieved by combining, in the system processor, optical backscatter data with other information about scattering sources in the air, such as:

(1) The processor can be programmed to recognize that when the airplane is in the stratosphere, or well above the freezing level in the troposphere, there will be no water-vapor clouds. (The processor can read the outside air temperature via a network connection from standard aircraft instrumentation.)

(2) Ice-crystal clouds are typically very diffuse, especially at cruise altitude, and they are visible to crews even by starlight. An exception is the ice crystal zone in the upper reaches of cumulonimbus clouds. These typically are predicted by weather forecasts and are often self-illuminating from lightning in the cloud, while the underlying water-vapor cloud is visible to on-board weather radar. The processor can be programmed to factor into its analysis information from weather forecasts and/or weather radar.

(3) The processor can be programmed to recognize that when no major forest fires have been reported recently, at least in the region upwind of the current location, there will be no unusual amounts of smoke at cruise altitude. (Smoke/visibility forecasts are available as pre-flight data for crews planning a flight.)

(4) The processor can be programmed to recognize that when a volcano in the region has been seismically active, or an eruption has occurred, the probability is increased that unusual scattering is due to volcanic ash.

In some embodiments, this type of supplemental information is used in a discrimination algorithm, such as a Bayesian inference network, that adjusts its a priori ash-warning criteria based on prior information about the probability of encountering various situations.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of an optical system that detects when the type of optical scattering outside the plane is compatible with the presence of volcanic ash at cruise altitude will now be disclosed. The detection method generally comprises the steps of activating a standard light source mounted to the exterior of the aircraft and using a camera to convert impinging backscattered light radiation into digital electronic image data. The images are captured at cruise altitude, where air is normally clear. The camera sends the electronic image data to a processor that determines whether that image data is compatible with the presence of volcanic ash particles in the surrounding atmosphere. An alert is activated in response to a positive determination.

Figure 1:
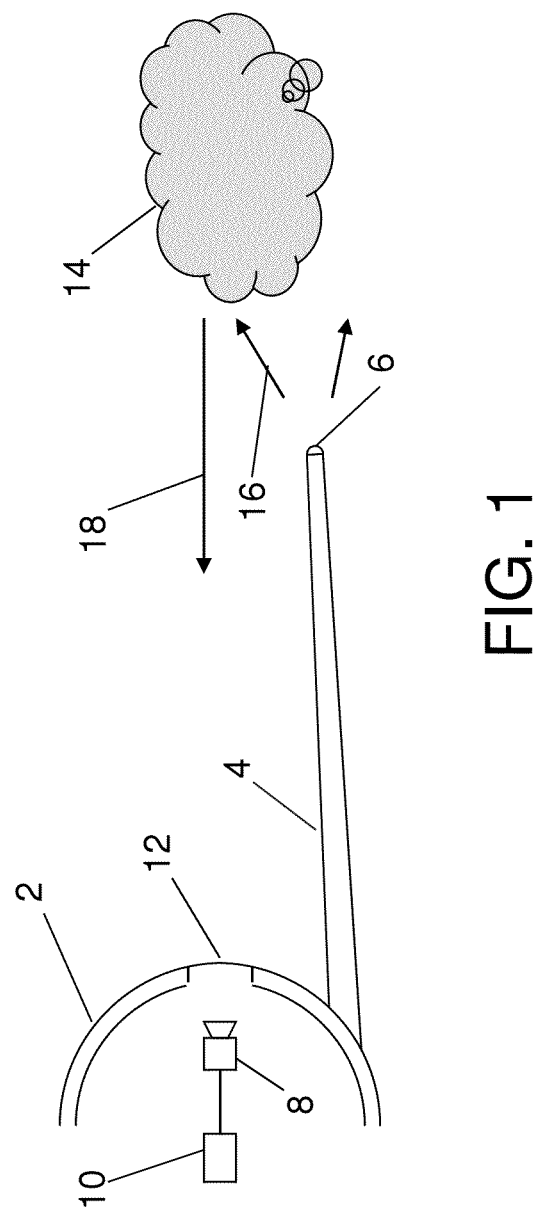
FIG. 1 is a diagram showing an embodiment in which a camera onboard an aircraft detects light from a wingtip strobe light which has been backscattered by ash particles in a diffuse volcanic plume.

In accordance with various disclosed embodiments, the external light source may be a strobe warning light or a forward-facing landing light. Alternatively, two or more light sources may be utilized concurrently in conjunction with respective cameras. In embodiments having two or more cameras, the electronic image data from each camera may be outputted to respective processors or a single processor. In accordance with one embodiment, an alert will be activated in response to the electronic image data from any camera being compatible with the presence of volcanic ash particles in the surrounding atmosphere. FIG. 1 shows an aircraft 2 equipped with a strobe light 6 mounted on a tip of a wing 4. The strobe light 6 is activated intermittently. With each flash of the strobe light, light radiation 16 is emitted directly into a volume of atmosphere outside the aircraft in the vicinity of the wing tip. As the aircraft moves, the atmosphere occupying the volume that receives the emitted light radiation will be different for each strobe flash.

The aircraft is provided with one or more digital cameras for capturing images of the volume of atmosphere in the path of the light radiation 16 emitted by strobe light 6. FIG. 1 shows a single camera 8. Camera 8 is mounted inside the cabin of aircraft 2 with its field of view directed through a window 12 and toward the volume of atmosphere which receives the light radiation 16 emitted by strobe light 6. FIG. 1 illustrates the case wherein some of the light radiation 18 emitted by strobe light 6 is backscattered by a diffuse plume 14 of volcanic ash particles. Some of the backscattered light radiation 18 is received by camera 8 and converted into electronic image data representing the image captured when camera 8 is activated. Preferably the image capture function of camera 8 is activated in synchronism with activation of the strobe light 6 and during the intervals of time between strobe light flashes in an alternating sequence.

The aircraft is further provided with a processor 10 which is connected to receive image data from camera 8. The camera 8 and processor 10 may take the form of a hand-portable unit which may be carried onboard the aircraft and set up in the cabin by a crew member. The processor 10 is programmed to determine whether the electronic image data captured by camera 8 is compatible with the presence of volcanic ash in the volume of atmosphere being monitored and issue an activation signal in response to a determination in the affirmative.

Figure 2:
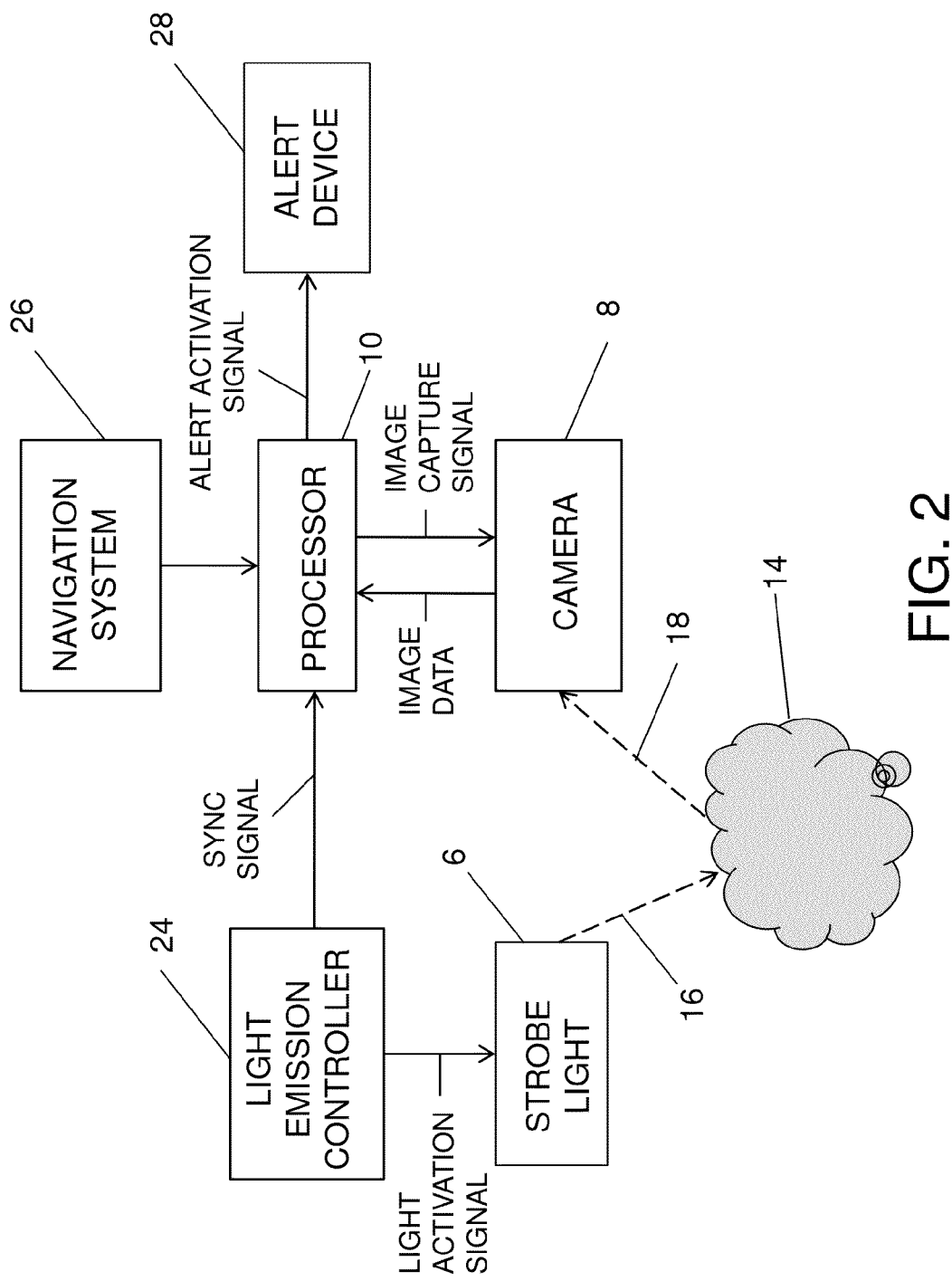
FIG. 2 is a block diagram showing components of an optical system for detecting strobe light backscattered from volcanic ash in accordance with a further embodiment of the invention.

Referring to FIG. 2, the strobe light 6 is activated to emit light radiation 16 periodically in response to issuance of a periodic light activation signal by a light emission controller 24. The light emission controller 24 also issues a synchronization signal to the processor 10 at or about at the same time that the light activation signal is sent. The processor 10 sends periodic image capture signals to activate the image capture function of camera 8. The processor uses the synchronization signal from the light emission controller 24 to synchronize the sending of image capture signals with strobe light flashing and to identify images captured during strobe flashes. Preferably, the image capture signals have a frequency twice the frequency of the synchronization signals, thereby causing camera 8 to capture images in succession when the strobe light flashes and midway between successive flashes, in alternating sequence.

In accordance with an alternative embodiment, the processor 10 does not receive a synchronization signal from the light emission controller 24 and does not send an image capture command to the camera 8. Instead camera 8 is allowed to run at its standard frame rate. This alternative embodiment does not require a physical connection between the light emission controller 24 and processor 10, thereby saving the cost of certifying a new interface to the light emission controller. In this case, the processor 10 captures a sequence of electronic images from the camera 8 at fixed time intervals, computes a Fourier transform of the intensity of those images, selects the phase and frequency yielding the greatest integrated intensity as the phase and frequency of the aircraft light being activated, and selects the phase and frequency yielding the smallest integrated intensity as the phase and frequency of the aircraft light being inactivated.

The digital data for each captured image is sent from camera 8 to processor 10. The processor 10 is configured to compare successive images (e.g., by subtracting one from another, pixel-by-pixel) and, when the mean difference between successive images exceeds a user-specified threshold, transmit an alert activation signal to an alert device 28, preferably located in the cockpit. The alert device 28 in turn displays/announces a warning message (i.e., visible or audible) to the aircraft crew.

In this embodiment, each time a strobe flashes, the camera image being captured at that time will contain any of the strobe's light scattered from ash near the wingtip. The previous camera image will not contain such light. Therefore, comparing successive images may reveal a visual difference between a strobe-lit volume of air and an unlit volume of air. If that difference is substantial and the image is captured at cruise altitude, where air is normally clear and the aircraft is far from any ambient light source that might illuminate the two volumes of air differently, then it is reasonable for the processor 10 to infer the likely presence of volcanic ash and issue an alert activation signal.

In accordance with various enhanced embodiments, the processor may be programmed to process the captured image data in accordance with one or more of the following procedures:

(1) The processor can be configured to integrate (pixel by pixel) the intensity of multiple images captured during strobe flashes and compare that to the integrated intensity of multiple images captured when the strobe is not flashing. This integration over multiple images improves the sensitivity and the signal-to-noise ratio, allowing this embodiment to reliably detect ash at a lower concentration than an embodiment that subtracts one image from another image, pixel by pixel.

(2) The processor can be configured to capture a series of images at fixed time intervals, compute the intensity of each image, use an algorithm like the Fourier transform to extract the phase and frequency of strobe flashes from that series of images; and compare the in-phase intensity amplitude to the out-of-phase intensity amplitude. This algorithmic approach to determining the times at which the strobe flashes can eliminate the need for a synchronization signal from light emission controller 24 to the processor 10. This avoids the substantial cost associated with certifying a new interface to an existing safety critical element like the light emission controller.

(3) The processor can be programmed to apply different statistical weights to various pixels in a captured image. The statistical weight of each pixel is chosen to maximize the influence of pixels where a relatively large amount of scattered light is expected when dangerous amounts of ash are in the air, and to minimize the influence of pixels where the amount of scattered light changes little or not at all regardless of how much ash is present. (The weights are typically stored in a matrix matching each weight W to the pixel's row, r, and column, c, i.e., W=f(r,c), where f is the statistical weighting function.) Optionally, the statistical weights can be selected using an analytical computer model of strobe light scattering in a diffuse volcanic plume. Alternatively, the statistical weights can be selected as a result of optical measurements of strobe light scattering in a diffuse particulate cloud.

(4) The processor can be programmed to recognize point sources of light such as stars, streetlights, or other aircraft visible in an image, and to digitally remove these point sources before calculating the image intensity (pixel by pixel). This digital cleanup minimizes the effect of light sources unrelated to the aircraft or to particles in the air.

(5) The processor can be configured to: (a) receive data from an aircraft navigation system 26 (see FIG. 2); (b) use that data to predict locations of extended light sources (such as the Milky Way, the moon, or urban areas) in the image; and (c) remove the pixels corresponding to those locations from the set of pixels used to decide whether to issue a warning to the crew.

(6) The processor can be configured to automatically adjust the warning threshold to account for non-volcanic factors that affect the scattering coefficient of air at cruise altitude, such factors including at least one of the following: variations in tropopause altitude depending on latitude; regular seasonal variations in smoke from burning fields in agriculture; seasonal variations in dust from plowing and harvesting; a dust-removing effect from large storms; variations in high-altitude sulfur dioxide particulates due to changes in jet traffic density (jet fuel includes small amounts of sulfur); and meteor showers which add dust to the stratosphere.

In the case where the processor is configured to automatically adjust for the effects of meteor showers, the processor needs, at a minimum, some means to determine the date—either an internal clock or a network connection with access to date information. Most meteor showers occur at the same time each year, with about the same intensity each year, so normal fluctuations in high-altitude dust are fairly predictable. (The total flux is also quite small compared to the amounts encountered after a volcanic eruption.) Even exceptionally strong meteor storms, such as the 1999 Perseids, can now be forecast with good precision.

Meteoritic dust is deposited at altitudes of about 50 miles and takes a few days or weeks to filter down to cruise altitudes, so even if a strong meteor shower is not forecast in advance, its effect on optical scattering at cruise altitude can be forecast days or weeks ahead of time by a ground-based system. That forecast can then be transmitted to the processor via a communication network or loaded into the processor by a crew member.

Figure 3:
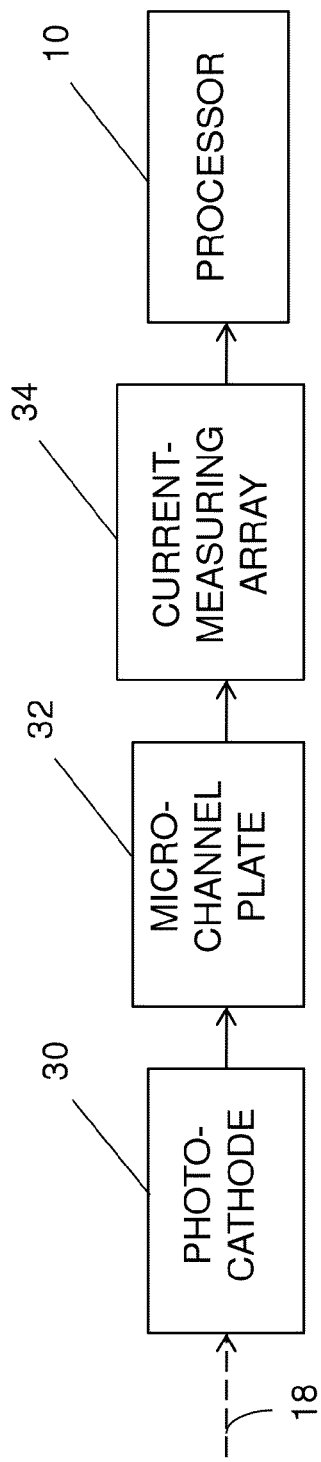
FIG. 3 is a block diagram showing components of a camera suitable for use in the embodiment depicted in FIG. 2.

In accordance with a further embodiment, the camera comprises an image-intensifier system, such as a photomultiplier or avalanche photodiode. In accordance with one specific embodiment depicted in FIG. 3, the image intensifier is like a starlight scope, where an optical image is formed on an electron-emitting photocathode 30. Electrons from each point on the plate are multiplied by transit through a micro-channel plate 32 in which each narrow microchannel is a photomultiplier. A particle or photon that enters one of the channels through a small orifice impinges on the wall of the channel because the channel is at an acute angle relative to the plate. The impact of the particle or photon starts a cascade of electrons that propagates through the microchannel, thereby amplifying the original signal by several orders of magnitude. The electrons exit the channels on the opposite side of the plate, where they are detected by a current-measuring array 34. As a result, the electron intensity at each small region on the final current-measuring array 34 is proportional to the optical intensity at the corresponding region on the photocathode 30. This image data is then sent to a processor 10.

In accordance with a further embodiment, a camera and a computer are arranged as components of a portable system that can be carried on and off the airplane by crew members and mounted in a temporary installation with a view out through a window. (The setup is comparable to a camera-equipped cell phone or laptop, small enough and simple enough to not require lengthy FAA certification.) In one such embodiment, the computer transmits a warning message to an alert device via a wireless network onboard the aircraft. In another embodiment, the computer produces a visual or audible warning on its display.

In cases where a camera and computer are combined in a portable system and statistical weighting is utilized, the computer's processor is preferably programmed to perform the following operations after setup: (a) locate the wing tip in each pixel image, (b) compute the wing tip's displacement ($\Delta r$, $\Delta c$) from its assumed location (row $r_0$ and column $c_0$ in the image) when the matrix of statistical weights was chosen, and (c) digitally translate the matrix of statistical weights by the offset ($\Delta r$, $\Delta c$) so that the weight applied to each pixel is appropriate for the current location of the wingtip. This embodiment helps retain the performance gained by statistically weighting each pixel, even when the camera is not oriented the same as when the weighting matrix was chosen.

Figure 4:
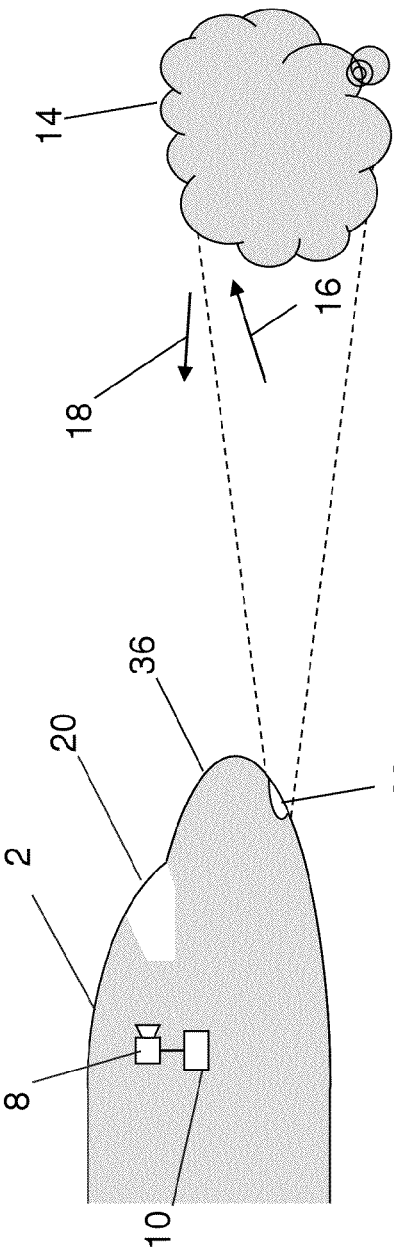
FIG. 4 is a diagram showing an embodiment in which a camera onboard an aircraft detects light from a forward-facing landing light which has been backscattered by ash particles in a diffuse volcanic plume.

FIG. 4 shows an aircraft 2 equipped with a forward landing light 22 mounted on its nose 36. The landing light 6 is activated intermittently during flight at cruise altitude. With each activation of the landing light 22, light radiation 16 is emitted directly into a volume of atmosphere outside and in front of the aircraft.

In accordance with the further embodiment shown in FIG. 4, the aircraft 2 is provided with one or more digital cameras for capturing images of the volume of atmosphere in the path of the light radiation 16 emitted by landing light 22. FIG. 4 shows a single camera 8 connected to send image data to a processor 10. Camera 8 is mounted inside the cockpit of aircraft 2 with its field of view directed through the windshield 20 and toward the volume of atmosphere which receives the light radiation 16 emitted by landing light 22. FIG. 4 illustrates the case wherein some of the light radiation 18 emitted by landing light 22 is backscattered by a diffuse plume 14 of volcanic ash particles. Some of the backscattered light radiation 18 is received by camera 8 and converted into electronic image data representing the image captured when camera 8 is activated. The processor 10 is programmed to determine whether the electronic image data captured by camera 8 is compatible with the presence of volcanic ash in the volume of atmosphere being monitored and issue an activation signal in response to a determination in the affirmative.

More specifically, the processor periodically receives digital images from the camera. In the processor's memory is a reference image captured when the aircraft had its landing light on, but was not flying through ash. The processor is configured to compare each image to the reference image (e.g., by subtracting one from the other, pixel by pixel) and, when the mean difference between the images exceeds a user-specified threshold, transmit a signal that activates an alert device. As previously described, the alert device displays or announces a warning message to the aircraft crew.

The embodiment depicted in FIG. 4 has the advantage that a landing light is more directional than a wingtip strobe light, so it produces scattering at a greater distance. Further, since it points forward, it may give the crew some warning before the aircraft enters the volcanic plume. However, it is unlikely to be useful on those aircraft whose landing lights can only be turned on when the landing gear is extended because the drag would be prohibitive for cruise flight.

In accordance with a further embodiment, the processor is programmed to periodically (a) turn on the aircraft landing light, (b) capture and integrate a series of images, (c) turn off the aircraft landing light, (d) capture and integrate a series of images, (e) compare the integrated intensity with landing light on to the integrated intensity with landing light off, and (f) if the intensity difference exceeds a user-specified threshold, activate an alert device to issue a warning to the crew. This embodiment gains some of the signal processing advantages of the strobe light system (described hereinabove) and does not require the landing light to be left on all the time. (Landing lights are expensive to replace, though this may be less of an issue in future generations of aircraft with new types of landing lights.)

In some modern aircraft, the intensity of the landing lights is modulated, rising and falling in brightness about 45 times per minute. Apparently this is effective in scaring away birds and thereby reducing bird strikes. Such modulated landing lights act somewhat like strobe lights, although the pattern is a sinusoidal rise and fall rather than a brilliant flash lasting about one microsecond. In accordance with further alternative embodiments, the methods (disclosed above) for detecting light emitted by a flashing strobe light and then backscattered by the atmosphere can also be used to detect the amount of light emitted by a modulated landing light and then backscattered by the atmosphere.

The embodiments which utilize backscattered landing light radiation may be further improved by programming the processor to apply different statistical weights to various pixels in an image. The statistical weight of each pixel is chosen to maximize the influence of pixels where a relatively large amount of scattered light is expected when dangerous amounts of ash are in the air, and to minimize the influence of pixels where the amount of scattered light changes little or not at all regardless of how much ash is present. (This minimizes the effect of image noise or background light compared to the effect of volcanic ash.) The matrix of weights will be different for a landing light beam than for the wide-angle light pattern from a wingtip strobe.

Figure 5:
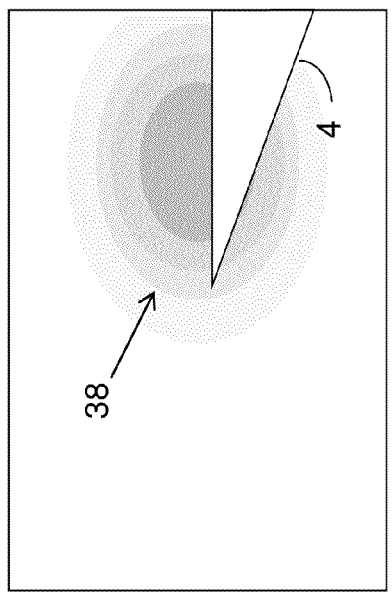
FIG. 5 is a diagram depicting the statistical weighting of pixels looking from a window behind an aircraft wing at light radiation from a wingtip strobe light being backscattered by ash particles in a diffuse volcanic plume in accordance with another embodiment of the invention.
Figure 6:
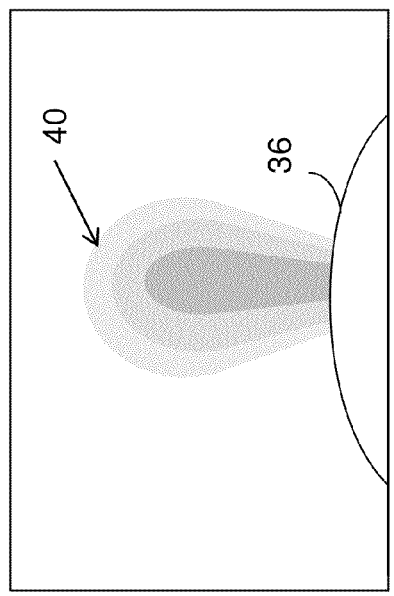
FIG. 6 is a diagram depicting the statistical weighting of pixels looking from a cockpit at light radiation from a nose-mounted landing light being backscattered by ash particles in a diffuse volcanic plume in accordance with a further embodiment of the invention.
Figure 7:
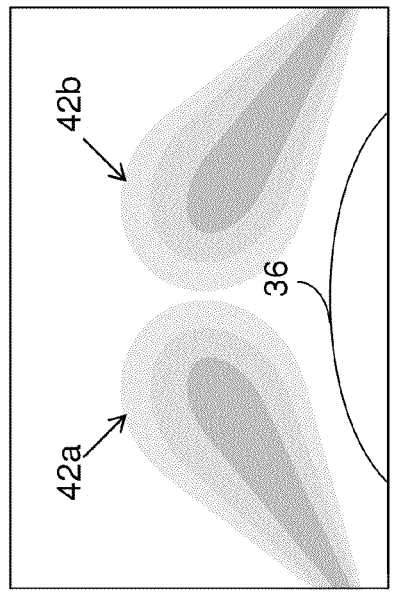
FIG. 7 is a diagram depicting the statistical weighting of pixels looking from a cockpit at light radiation from two wing-mounted landing lights being backscattered by ash particles in a diffuse volcanic plume in accordance with yet another embodiment of the invention.

Which pixels have a strong scattering signal will depend on the beam pattern emitted by a particular light. The beam for a landing light is narrow; the beam for a wingtip strobe light is broad. To use this information effectively, the statistical weights must take into account the beam shape and the location and orientation of the beam in the camera image. FIGS. 5-7 depict three examples of how such weighting might be applied. Darker shading means higher weight. The outline of a wing 4 (see FIG. 5) and an aircraft nose 36 (see FIGS. 6 and 7) are included for reference; they are not part of the weighting matrix.

FIG. 5 depicts the statistical weighting 38 of camera pixels looking from a window behind an aircraft wing 4 at light radiation emitted from a wingtip strobe light and backscattered by ash particles in a diffuse volcanic plume. FIG. 6 depicts the statistical weighting 40 of camera pixels looking from a cockpit at light radiation emitted from a landing light mounted on the nose 36 of an aircraft and backscattered by ash particles in a diffuse volcanic plume. FIG. 7 depicts the statistical weightings 42a and 42b of pixels looking from a cockpit at light radiation emitted from two wing-mounted landing lights and backscattered by ash particles in a diffuse volcanic plume.

The disclosed embodiments have the following advantages:

(1) Naked eye observation is almost entirely dependent on the flight crew, not the cabin crew or passengers. The flight crew typically looks forward from the cockpit, not sideways and backward to the air near the wingtip strobes. Therefore, naked eye observation relies on ambient light. However, there is little or no ambient light at night, especially on moonless nights. The disclosed embodiments use light emitted by the aircraft, so they can detect when conditions are compatible with the presence of volcanic ash even during moonless nights.

(2) Because some of the systems disclosed hereinabove integrate over several images and/or use image intensifiers, they are more sensitive to scattered light than the human eye is. Therefore such systems provide warning of volcanic plumes that are more diffuse than the naked eye could detect, even if they were staring at the air near the wing tip.

(3) Because some of the systems disclosed hereinabove compare the image intensity to a fixed threshold, they are more reliable at measuring the intensity of scattered light than the human eye, which is insensitive to slow changes in intensity. Therefore such systems provide warning of volcanic plumes whose visual onsets are slower than the naked eye could detect.

(4) Because the systems disclosed hereinabove monitor scattering during a larger fraction of the time than a human crew member can, they provide more reliable warning that an aircraft is entering a volume of diffuse ash.

(5) Because volcanic plume forecasts provide coarse spatial resolution and are based on non-real-time data, they are often incorrect at various locations within a region. For safety, airlines and regulators often choose flight routes that avoid predicted ash locations by a large margin. These routes are inefficient, wasting time, fuel and money. The disclosed embodiments provide local, real-time information that can supplement the regional forecast, informing the crew when the aircraft begins to enter an unpredicted region of ash. This allows airlines and regulators to safely choose flight routes that pass closer to predicted ash locations. These routes are more efficient, saving time, fuel and money.

(6) Installing a special-purpose optical emitter, especially on the outside of aircraft, requires substantial engineering, adds mass, and invokes the slow, costly FAA certification process. Because the disclosed embodiments use active optical sources already on the aircraft, they avoid most of the engineering, most of the mass, and most of the delay and cost of the certification process.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The method claims set forth hereinafter should not be construed to require that the recited steps be performed in the order recited.

The invention claimed is:

1. A method for automatically detecting the presence of airborne particles outside an aircraft during flight, comprising the following steps:
   (a) placing a camera inside the aircraft with its field of view directed toward a volume that receives light radiation from a standard aircraft light mounted to the aircraft;
   (b) activating the aircraft light;
   (c) using the camera to convert impinging light radiation into electronic image data of respective images captured when the aircraft light is activated and when the aircraft light is not activated;
   (d) determining whether said electronic image data is compatible with the presence of volcanic ash in said volume;
   (e) issuing an activation signal in response to a determination that said electronic image data is compatible with the presence of volcanic ash in said volume; and
   (f) generating a perceptible alarm in response to issuance of said activation signal,
   wherein operations (d) and (e) are performed by a computer.

2. The method as recited in claim 1, wherein step (d) comprises applying different statistical weights to the electronic image data of each image, wherein said different statistical weights are a function of a beam pattern emitted by the aircraft light.

3. The method as recited in claim 2, wherein the aircraft light is mounted to a wing tip of the aircraft, further comprising the step of adjusting the statistical weights as a function of displacement of the wing tip.

4. The method as recited in claim 1, wherein step (d) comprises removing electronic image data representing point sources of light visible in an image.

5. The method as recited in claim 1, wherein step (d) comprises:
   comparing the electronic image data for successive images respectively captured when the aircraft light is and is not activated; and
   determining whether the difference between the electronic image data for successive images exceeds a threshold.

6. The method as recited in claim 1, wherein step (c) is performed multiple times and step (d) comprises:
   (i) integrating the intensity of multiple images captured when the aircraft light is activated;
   (ii) integrating the intensity of multiple images captured when the aircraft light is not activated;
   (iii) comparing the integrated intensity derived by step (i) to the integrated intensity derived by step (ii); and
   (iv) determining whether the difference between those successive images exceeds a threshold.

7. The method as recited in claim 1,
   further comprising the steps of carrying a hand-portable unit onboard the aircraft, the hand-portable unit comprising the camera and a processor, wherein the processor performs steps (d) and (e).

8. An aircraft comprising:
   (a) a standard aircraft light that emits light radiation toward a volume external to the aircraft;
   (b) a camera inside the aircraft with its field of view directed toward said volume, wherein said camera converts impinging light radiation into electronic image data of respective images captured when the aircraft light is activated and when the aircraft light is not activated;
   (c) a controller for activating the aircraft light;
   (d) a processor programmed to determine whether said electronic image data is compatible with the presence of volcanic ash in said volume and issue an activation signal in response to a determination that said electronic image data is compatible with the presence of volcanic ash in said volume; and
   (e) an output device that generates a perceptible alarm in response to issuance of said activation signal.

9. The aircraft as recited in claim 8, wherein the aircraft light is mounted to a wing tip of the aircraft.

10. The aircraft as recited in claim 8, wherein the aircraft light is mounted to a nose of the aircraft.

11. The aircraft as recited in claim 8, wherein the aircraft light is a strobe light.

12. The aircraft as recited in claim 8, wherein the aircraft light is a landing light.

13. The aircraft as recited in claim 8, wherein said controller sends a synchronization signal to said processor when the aircraft light is activated, and said processor sends an image capture signal to said camera in response to said synchronization signal.

14. The aircraft as recited in claim 8, wherein said processor captures a sequence of electronic images from said camera at fixed time intervals, computes a Fourier transform of the intensity of said images, selects the phase and frequency yielding the greatest integrated intensity as the phase and frequency of the aircraft light being activated, and selects the phase and frequency yielding the smallest integrated intensity as the phase and frequency of the aircraft light being inactivated.

15. The aircraft as recited in claim 8, wherein said processor is further programmed to apply different statistical weights to the electronic image data of each image, wherein said different statistical weights are a function of a beam pattern emitted by the aircraft light.

16. The aircraft as recited in claim 15, wherein the aircraft light is mounted to a wing tip of the aircraft, and said processor is further programmed to adjust the statistical weights as a function of displacement of the wing tip.

17. The aircraft as recited in claim 8, wherein said processor is further programmed to remove electronic image data representing point sources of light visible in an image.

18. The aircraft as recited in claim 8, wherein said processor is further programmed to compare the electronic image data for successive images respectively captured when the aircraft light is and is not activated, and then determine whether the difference between the electronic image data for successive images exceeds a threshold.

19. The aircraft as recited in claim 8, wherein said processor is further programmed to:
   (i) integrate the intensity of multiple images captured when the aircraft light is activated;
   (ii) integrate the intensity of multiple images captured when the aircraft light is not activated;
   (iii) compare the integrated intensity derived by step (i) to the integrated intensity derived by step (ii); and
   (iv) determine whether the difference between those successive images exceeds a threshold.

20. A method for automatically detecting the presence of airborne particles outside an aircraft during flight, comprising the following steps:
   (a) emitting light radiation toward a volume external to the aircraft;
   (b) converting light radiation backscattered from said volume into electronic image data of respective images, said images being captured at different times;
   (c) processing said electronic image data to derive the amount of backscattered light radiation and the rate of change of said amount;

(d) determining whether said amount and said rate of change are compatible with the presence of volcanic ash in said volume;

(e) issuing an activation signal in response to a determination that said amount and said rate of change are compatible with the presence of volcanic ash in said volume; and (f) generating a perceptible alarm in response to issuance of said activation signal, wherein operations (c) through (e) are performed by a computer.

21. The method as recited in claim 20, wherein said emitted light radiation is emitted by a standard aircraft light such as a landing light or a strobe light.

22. A method for automatically detecting the presence of airborne particles outside an aircraft during flight, comprising the following steps:

(a) emitting light radiation toward a volume external to the aircraft when said volume contains a safe level of or no volcanic ash particles;

(b) converting light radiation backscattered from said volume into electronic image data of a reference image;

(c) after steps (a) and (b) have been performed, emitting light radiation toward said volume;

(d) converting light radiation emitted in step (c) and backscattered from said volume into electronic image data of a non-reference image;

(e) comparing said electronic image data of said reference and non-reference images;

(f) determining whether the difference between said reference and non-reference images exceeds a threshold;

(g) issuing an activation signal in response to a determination that said difference exceeds said threshold; and (h) generating a perceptible alarm in response to issuance of said activation signal, wherein operations (e) through (g) are performed by a computer.

* * * * *